United States Patent Office 2,844,607
Patented July 22, 1958

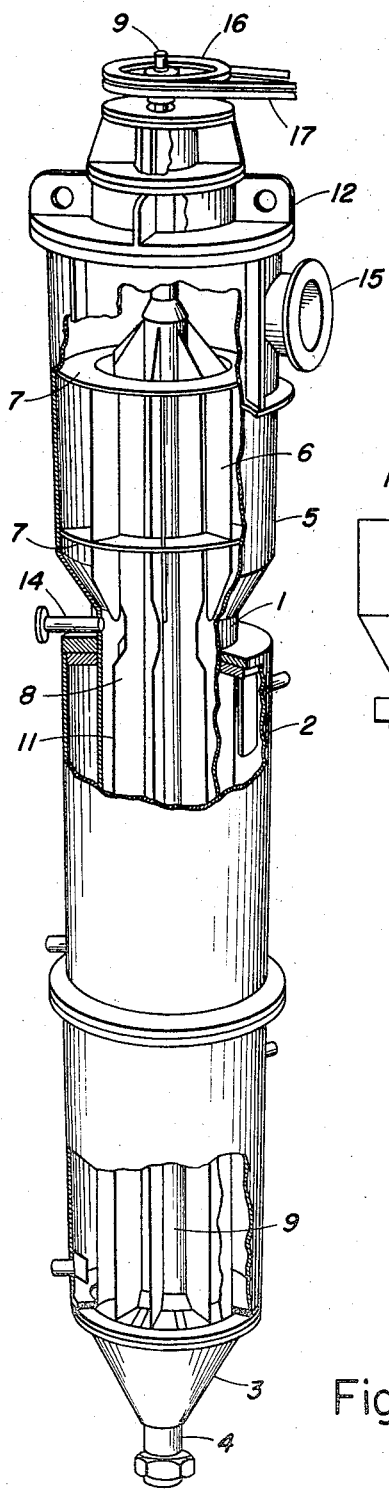
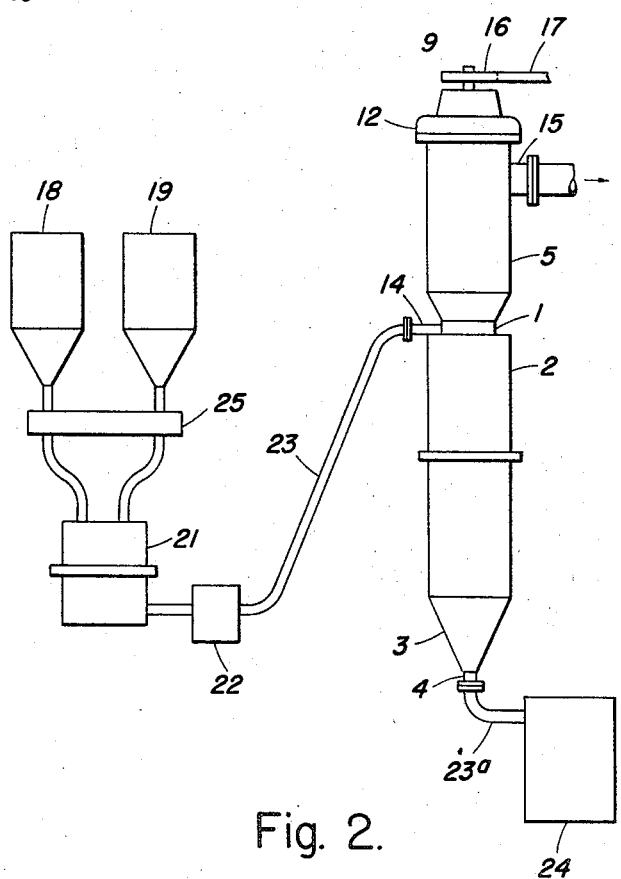
Fig. 1.
Fig. 2.

2,844,607

PROCESS FOR THE MANUFACTURE OF SULPHO-ALKYLESTERS OF FATTY ACIDS

Harold Gushin and Frederick J. Zelman, Roselle, N. J., assignors to General Aniline & Film Corporation, New York, N. Y., a corporation of Delaware Application August 9, 1956, Serial No. 603,086

5 Claims. (Cl. 260—400)

The invention here presented is a new process for the preparation of sulphoalkylesters of fatty acids, in which a stream of reaction mixture in the form of a coarse slurry is delivered to a centrifugal reactor in which the reaction material is thrown violently against a heated cylindrical wall and maintained in turbulent flow along that wall by a rapidly rotating vane system whereby sufficient turbulence is obtained to dislodge the reaction product from the surface of the reactor, and simultaneously to apply to the solid particles in the slurry, a substantial amount of attrition which breaks up the slurry particles and dislodges a reaction film from the surface, the combined effect being to give a very rapid reaction while highly accurate temperature control is maintained and a steady uniform throughput is obtained to yield a very rapid reaction with a sharp reduction in side reactions, a higher reaction efficiency and a very significantly lower cost.

There has been need for a variety of substances, used as intermediates for dyestuffs, pharmaceuticals and the like, which are best prepared by a reaction of sodium-isethionate with a fatty acid halide as well as other similar reactions. In the past these reactions have been carried out batchwise after a very thorough grinding of the solid components of the reaction. A very substantial improvement in this reaction has been obtained by the procedure shown in the copending application of H. H. Tiedemann, Serial 460,438, filed October 5, 1954, by which the reaction mixture is prepared by grinding the organic acid salt of a reactive metal into a very fine powder, slurrying the powder with a carboxylic acid chloride to form a homogeneous slurry, and conducting the reaction on a heated metallic surface such as a drum-drier. This procedure yields a very excellent product and is a very satisfactory method of conducting the reaction, but it has the disadvantage that the solid reactant must be very finely powdered, and the reaction on the drum-drier is slow, thereby involving relatively high costs.

According to the present invention it is now found that if the reaction is conducted in a device having the form of a heated cylinder with a set of rapidly rotating vanes therein, the edges of which have a relatively small clearance from the heated cylinder, together with means for providing a rapid rotation of the vane system and means for the delivery to and discharge from the device of materials in the form of a mixture or slurry in which it is desired to cause a reaction; such devices being available on the market under such names as "Turba-Film" Evaporator or "Roto-Vak" or "Adjusto-Film" or the like, as shown in the drawing, in which a central vertical shaft is equipped with vanes and positioned inside of a heated cylinder; the device being equipped with an inlet duct a short distance below the top of the rotor, and an outlet duct at the bottom, below the rotor, a highly efficient system is obtained. Accordingly the reaction components are mixed, without special grinding or pulverizing to yield a coarse slurry which is delivered through the input duct to the rotor, caught by the vanes of the rotor and thrown violently against the heated cylindrical wall, then caught again by the edges of the rotor and brought into a condition of violent turbulence as the material flows slowly along the heated cylindrical wall. The result is a rapid reaction on the surfaces of the granules in the slurry and dislodgment of the reaction product from the surface of the granules, making available fresh reaction surface. The reaction material forms a highly turbulent film on the inner surface of the heated wall which however is so thin that no hot spots appear, and accordingly the reaction does not overheat but is held strictly at the desired reaction temperature. In addition, the spinning blades of the rotor keep the film on the surface in violent turbulence and keep it from building up anything thicker than the clearance distance between the edges of the rotor blades and the wall. This clearance may, if desired, be made less than the average particle size in the slurry with the result that the slurry particles are subjected to intensive attrition during the reaction, making unnecessary any grinding or special subdivision, since the reaction occurs on the surface of the solid particles and the reaction product is dislodged from the surface as rapidly as it forms, a procedure possible in no other known device. Accordingly the completed reaction product is delivered from the bottom outlet, the total amount of reaction material in the reactor is very small, ranging from a few ounces to a small number of pounds, the throughput rate is very high, and the reaction is carried to completion within the reactor, and little or no unreacted material escapes from the bottom outlet.

Thus the process of the present invention mixes together two reactants, one of which is fluid or can be made fluid by a suitable heating procedure, the other of which is solid at the reaction temperature, passes them over a heated wall in the presence of a rapidly rotating member which produces a violent turbulence in a film of reactant material on the heated wall, whereby a rapid reaction is obtained, hot spots are prevented, the necessity for fine grinding is obviated and a complete, highly efficient economical combination and reaction is obtained. Other objects and details of the invention will be apparent from the following description when read in connection with the accompanying drawings, wherein Figure 1 is a view in vertical elevation, partly in section of the reactor member of the present invention, and Figure 2 is a diagrammatic showing of the complete processing apparatus.

Referring to Figure 1, the reactor of the present invention consists of a vertical cylindrical member 1, having a jacket member 2 to form a steam jacket around the member 1. The member 1 is closed at the bottom by a conical member 3 having an outlet connection 4. The top of the member 1 is expanded into a chamber 5 within which are positioned stationary baffle members 6 carried upon a collar member 7 attached to the surface of the chamber 5.

Within the member 1 and member 5 there is then positioned a rotor member 8 made up of a central shaft 9 and blade members 11. The chamber 5 is closed at the top by a header member 12. An inlet member 14 is provided leading into the member 1, which is below the enlargement which forms the chamber 5. A vapor outlet member 15 is provided at the top of the chamber member 5 and the shaft 9 is extended upward from a packing gland member (not shown) and a pulley member 16 is mounted upon the upper end of the shaft 9 for driving by a belt 17 from a motor (not shown) the rotor 8 is preferably driven at a speed within the range between about 400 R. P. M. and 2000 R. P. M.

Referring to Figure 2, there is provided a container 18 for the reception of a reactant, and a second container 19 for a second reactant. These reactants may be both solids, or both liquids, or preferably one a solid and the other a liquid. Discharge ducts from the containers 18 and 19 are led to a mixer member 21 which may take any convenient form which will make a reasonably thorough mixture of the two components. It may take the form merely of a paddle mixer or a container having a propeller stirrer, or an anchor stirrer, or may be a Werner-Pfleiderer kneader as desired, or as required by the physical condition of the reactant materials. It is however desirable that the mixture should flow, either by virtue of fluidity in at least one of the components (or by virtue of the presence of a fluid diluent), or that both particles be pulverulent, so that they will flow like dry sand. The discharge from the mixer 21 is then conveyed by a pump, or other conveyer member 22 through a duct 23 to the input 14 of the reactor. The reaction mixture then is heated by the steam within the jacket 2 and the reaction occurs as the material flows downward along the inside of the member 1 to the cone 3 and discharge 4. From the discharge 4 the material is carried by a duct member 23a to a receptacle 24 in which the reaction mixture may be cooled or other treatment given to it, as desired, including such procedures as further reaction, pulverizing, granulating, cooling and the like.

A highly desirable and advantageous reaction may be conducted in this device for the preparation of esters of carboxylic acid chlorides with 2-hydroxyalkane sulfonic acid salts of alkali metals and the like. For this purpose dry sodium-isethionate in coarsely pulverized form may be delivered to the container 18 and a suitable fatty acid halide may be delivered to the container 19, the two being delivered in appropriate proportions through a suitable proportioning device 25 to the mixer 21 where they are roughly mixed. The mixture is then delivered through the duct 23 to the input 14 of the reactor 1. Rotation of the blades 11 throws the slurry of sodium-isethionate in fatty acid halide against the heated wall member 1 where it is promptly brought up to the reaction temperature as set by the material in the jacket 2 which may be steam under appropriate pressure or may be hot water or Dowtherm or may be molten lead or any other fluid heating material which will give the desired temperature. Usually an elevated temperature is required, but lower temperatures, as obtained by refrigeration, are not excluded. The strong centrifugal force developed by the spinning blades 11 throws the solid portion of the slurry against the wall member 1 and effects immediately a substantial reduction in particle size. At the same time reaction occurs on the surface of the particles to yield a reaction product having different physical properties, sufficient to permit the breaking away of the reaction product from the particle surface. The small clearance between the spinning blades 11 and the heated wall 1 results in a very high turbulence in the film on the member 1, the film being partly dragged around the wall by force developed by the blades, and partly carried downward in a spiral path by gravity. However the rapid motion of the blades 1 yields a violent turbulence in the film of the active material on the wall 1, resulting in an extremely good mixing of the reactants and a rapid removal of the reaction product from the surface of the solid particles. The rate of delivery of the reaction mixture to the input duct 14 determines in large measure the rate at which the material flows downward, a heavy stream giving a more rapid downward flow than a small stream. If the reactant materials are in the form of a fine grain slurry so that the reaction proceeds rapidly, the clearance between the vanes 11 and the wall 1 may be made relatively great, and a rapid flow occurs. If the reaction is slow, or if the reaction product is slow to part from the slurry particles, then a smaller stream may be used and a slower reaction obtained. Also the reaction time may be in considerable measure controlled by the length of the member 1, a short length giving a shorter reaction time.

The following examples are offered as showing the best known process for practising the invention; not as imposing limitations upon the claims solicited.

*Example 1*

Into container 18 charge 10 lbs. of sodium-isethionate. Into container 19 charge 16 lbs. of coconut fatty acid chloride.

These are then proportioned through device 25 into mixer 21. The slurry from mixer 21 is fed through pump 22 at the rate of 60 lbs. per hour to the "Turba-Film" which has 8.5 square feet of wall surface.

The "Turba-Film" is heated by steam (55 lbs. per square inch in the jacket) and the rotor blades are turning at 720 R. P. M. The product is collected in chamber 24.

Yield: 24 lbs. of product.

A considerable number of runs, according to the above stated example, were made varying the temperature in the jacket, the rate of feed and the rotor speed. These subsequent tests showed that there was no significant difference between the various temperatures within the range between about 240° F. and 350° F. Similarly the series of tests showed that there were no significant differences produced by differences in rotor speed between about 720 and 1100 R. P. M. Similarly there were no significant differences in the amount of unreacted material between a very small stream of reactants and a stream as large as the reactor would handle; there being a substantially complete reaction with all rates of feed, up to the point where the amount of material in the rotor was so great as to require an undue power input.

The above indicated tests were made using sodium-isethionate and a coconut fatty acid chloride as the reactants. However the reaction is equally effective with any of the fatty acid chlorides, without regard to the molecular weight, or carbon atom member therein. Thus the reaction proceeds with acetal chloride in which there are 2 carbon atoms in the carbon atom chain, and it proceeds equally well with stearic acid chloride having 18 carbon atoms in the chain. The reaction proceeds equally well with any of the intervening carbon atom chain members. Similarly the reaction proceeds equally well with oleic acid chloride.

The reaction is most satisfactory when at least one of the reactants is liquid, or melts at the reaction temperature. In some instances a satisfactory reaction between 2 solids is obtained, but usually if both reactants are solid at the reaction temperature it is desirable that an inert carrier liquid be added to the reaction mixture.

Thus by the present invention there is produced a new and valuable method for conducting an economical reaction by which a reactant mixture or slurry is conveyed to a vertical cylinder containing rotating blades with close clearance from the cylinder wall, thrown against the cylinder wall and film formed thereon and maintained in violent turbulence on that wall while carried downwards in thin film by gravitation, whereby, very accurate temperature control is obtained, hot spots are avoided and a rapid reaction obtained by virtue of the violent turbulence which gives a highly intimate mixing of the reactants and dislodges reaction product from solid grains in a slurry.

While there are above disclosed but a limited number of embodiments of the device and process of the present invention it is possible to provide still other embodiments without departing from the inventive concept herein disclosed, and it is therefore desired that only such limitations be imposed upon the appended claims as are stated therein or required by the prior art.

The invention claimed is:

1. Process for the production of sulfoethylesters of fatty acids, which comprises forming a slurry by mixing together dry sodium-isethionate in coursely pulverized form with a fatty acid halide, delivering said slurry to a surface heated to an elevated temperature swept by rapidly moving members so as to produce a thin film of reaction product on said heated surface and simultaneously causing attrition of said film by violent turbulence effected by the said rapidly moving members, the turbulence and temperature being maintained until the reaction between the sodium-isethionate and the fatty acid halide is substantially complete, the attrition being utilized to separate the reaction product from said surface.

2. Process for the production of sulfoethylesters of fatty acids, which comprises forming a slurry by mixing together dry sodium-isethionate in coursely pulverized form with a fatty acid halide, delivering said slurry with force to a surface heated to an elevated temperature swept by rapidly moving members so as to produce a thin film of reaction product on said heated surface and simultaneously causing attrition of said film by violent turbulence effected by the said rapidly moving members, the turbulence and temperature being maintained until the reaction between the sodium-isethionate and the fatty acid halide is substantially complete, the attrition being utilized to separate the reaction product from said surface.

3. Process for the production of sulfoethylesters of fatty acids, which comprises forming a slurry by mixing together dry sodium-isethionate in coursely pulverized form with a fatty acid halide, delivering said slurry with force to a surface heated to a temperature of 240° F. to 350° F. swept by rapidly moving members so as to produce a thin film of reaction product on said heated surface and simultaneously causing attrition of said film by violent turbulence effected by the said rapidly moving members, the turbulence and temperature being maintained until the reaction between the sodium-isethionate and the fatty acid halide is substantially complete, the attrition being utilized to separate the reaction product from said surface.

4. Process for the production of sulfoethylesters of fatty acids, which comprises forming a slurry by mixing together dry sodium-isethionate in coursely pulverized form with a fatty acid chloride, delivering said slurry with force to a surface heated to a temperature of 240° F. to 350° F. swept by rapidly moving members so as to produce a thin film of reaction product on said heated surface and simultaneously causing attrition of said film by violent turbulence effected by said rapidly moving members, the turbulence and temperature being maintained until the reaction between the sodium-isethionate and the fatty acid chloride is substantially complete, the attrition being utilized to separate the reaction product from said surface.

5. Process for the production of sulfoethylesters of fatty acids, which comprises forming a slurry by mixing together 10 parts by weight of dry sodium-isethionate in coursely pulverized form with 16 parts by weight of coconut fatty acid chloride, delivering said slurry with force to a surface heated to a temperature of 240° F. to 350° F. swept by rapidly moving members so as to produce a thin film of reaction product on said heated surface and simultaneously causing attrition of said film by violent turbulence effected by the said rapidly moving members, the turbulence and temperature being maintained until the reaction between the sodium-isethionate and the fatty acid chloride is substantially complete, the attrition being utilized to separate the reaction product from said surface.

References Cited in the file of this patent

UNITED STATES PATENTS

| | | |
|---|---|---|
| Re. 23,823 | Molteni | May 4, 1954 |
| 1,881,172 | Daimler et al. | Oct. 4, 1932 |
| 2,129,896 | Whiteman | Sept. 13, 1938 |
| 2,130,362 | Muncie | Sept. 20, 1938 |
| 2,697,031 | Hervert | Dec. 14, 1954 |